May 31, 1932.  C. W. SIRCH  1,860,435
RADIATING MARINE APPARATUS
Filed March 12, 1928
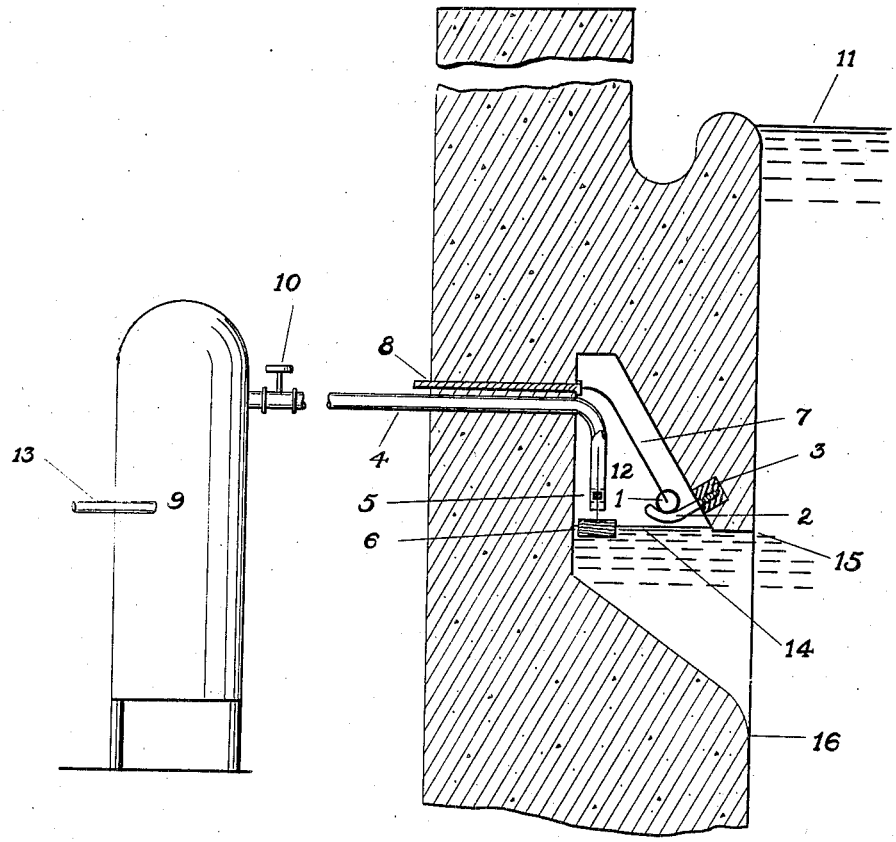

Patented May 31, 1932

1,860,435

UNITED STATES PATENT OFFICE

CHARLES W. SIRCH, OF LOS ANGELES, CALIFORNIA

RADIATING MARINE APPARATUS

Application filed March 12, 1928. Serial No. 260,957.

This invention relates to an automatically maintained air chamber containing piping and conductors and a port through which energy may be directly applied to a fluid. The invention can be employed in any situation where a body of liquid must be subjected to some special treatment, for example, in the treatment of the water of swimming pools to disinfect or sterilize and purify the water.

The object of my invention is to provide simple means for effecting the direct exposure of a fluid to energy or to rays; a further object of my invention is to protect the generators, lamps or source of the rays and the piping or conductors from contact with the fluid; a further object is a concealed source of submarine lighting or radiation; a further object is to maintain a predetermined water level in an air chamber. Further objects of the invention will appear hereinafter.

The invention consists in the novel parts and combination of parts to be described hereafter all of which contribute to produce an efficient radiating marine air chamber.

In marine lighting chambers it has heretofore been found necessary to protect the source of radiations, for example, of artificial light from the liquid by interposing a window or panel of glass, a material which, as is well known, reflects and absorbs light rays and thereby prevents much of the light from reaching the liquid. When submerged, as for example in so-called marine lights for swimming pools and the like, the surface of the glass panel soon becomes coated with a gelatinous growth and sediment—altogether combining to make the glass a comparatively inefficient medium for the introduction of light into a liquid. Moreover the use of glass in submarine lighting involves the risk of leaks occurring from the pool into the air chamber owing to difficulties of construction due to its fragility. In my construction it is not necessary to interpose a window or panel of glass between the light and the water so that the loss of the rays caused by such glass panels is avoided. In this way the efficient lighting or radiation into the water or a fluid is made possible.

In the drawing I illustrate a preferred embodiment of my radiating apparatus. This radiating marine air chamber may be formed or built in a masonry or metal wall or it may be attached to an existing swimming pool wall. It preferably includes a chamber or casing having a longitudinal opening which may be in the form of a slot located beneath the surface of the fluid, for example the water level of a pool, said slot being at a depressed point in the chamber constituting a port to the water within the pool. In a swimming pool this slot may be an opening located between the overhanging upper edge of the pool and a sloping or inclined face extending down into the pool from the chamber.

This chamber may be set in the wall of a pool or it may be set in or attached to the hull of water craft or it may be set in or attached to any structure below the level of an adjacent liquid.

A preferred embodiment of the invention is described in the following specification, while the broad scope of the invention is pointed out in the appended claims.

In the drawing:

The figure is a vertical section, broken away through the upper portion of the vertical wall surrounding a swimming pool including the top or promenade deck, and through the scum gutter, and illustrating my apparatus.

This radiating marine air chamber includes a chamber or casing, a port communicating from the pool to the chamber formed by and between the overhanging upper edge of a slot in the wall of the pool and the sloping lower edge of the slot.

In practicing the invention I construct an air chamber (12) as shown, and I provide a generator tube (1) resting on a support (2) which is screwed into a plug (3) set into the concrete, or fastened in any other suitable manner to the concrete. This tube generates radiant energy, and the rays from the tube pass into the water.

This support (2) is set high enough so that the water level (14) will always be beneath it. This water level will normally be that caused by the static head of water level (11) plus atmospheric pressure compressing the air in air pocket (12).

In order to prevent the water level in chamber from rising unduly, and in order to replenish any possible loss of volume resulting from escape or contraction of the air in the air chamber due to heating, cooling or absorption an air inlet pipe (4) is installed with a float (6) operating a valve (5) in the pipe in such a manner that when the float rises, the air is permitted to enter the chamber until it causes the water level and thereby the float to recede. In this position the float shuts off the air supply; (9) is a supply tank containing compressed air which may be further controlled by a reducing valve (10). The tank (9) is kept at a constant pressure sufficient to maintain (14) at its proper level, by means of an automatic air pump connected to (13).

An important part of this design is the location of the conduit (8) cast in the concrete which contains the conductor (7). This is placed as near the top of the air chamber as construction will permit so that should the air pump fail, there will always be enough air in the chamber to keep the water surface below the conductor (8). Clear or colored glass or metal screens may or may not be added to protect the tubes from mechanical injury. Other types of radiators or incandescent globes may be installed in a similar way.

In practicing the invention I construct the chamber so that it communicates with the body of liquid; it may be within the retaining wall, or within a casing attached thereto. It is mounted in such a way that air, vapor or gas entering or contained in the chamber will be trapped and sealed in the chamber by the water which enters the lower portion of the chamber to an elevation determined by the volume of the compressed air vapor or gas in the chamber. In the space above the water line in the chamber I suspend radiators or lamps, for example tubes filled with vapor or gas which glows when electrically energized through conductors led in from outside sources through the wall. I pass the rays from these tubes directly into and throughout the water in the pool. In order to prevent the water level from rising above a predetermined point within the chamber, for example the point at which the conductors or tubes would become submerged or nearly submerged in the water, I provide the chamber with a supply of compressed air from a receiver tank led in through a pipe in the wall and in order to shut off the compressed air supply pipe when there is sufficient in the chamber to maintain the desired water level I provide a valve on the pipe, said valve operated by a float resting upon the surface of the water within the chamber. In order that the rays of light may pass as freely as possible to the water in the pool through the port from the chamber I preferably place the lighting tube near the inner surface of the upper port edge (15) of the wall and I construct the lower edge of the port (16) in such form that it will cast the minimum of shadow upon the bottom of the pool. In order that the upper portion of the pool may receive reflected light I preferably form the lower surface of the chamber in such a manner that it will reflect light outwards from the chamber and upwards into the pool. When it is desirable I cause the fluid to move across the path of the radiations in the chamber.

It is obvious that my invention could be employed in connection with industrial apparatus where a body of liquid should be treated in any special manner by subjecting a portion of the liquid to contact with radiant energy or subjected to any apparatus that must be held near the surface of the liquid but not in contact with it.

It is obvious also that while it is most convenient to employ air in the pocket formed in the upper portion of the chamber 12, any gas could be used for this purpose, and in using the term "gas" throughout the specification and claims, I mean this term to include air, which is, of course, a gas. The term treating as used herein, and in the claims, refers to illumination of the liquid and/or any other exposure of the liquid to radiant energy.

It is understood that the embodiment of the invention described herein is only one of the many embodiments this invention may take, and I do not wish to be limited in the practice of the invention, nor in the claims, to the particular embodiment set forth.

I claim:

1. In apparatus for treating a body of liquid with radiant energy, the combination of a chamber having a depressed opening to admit the liquid into the chamber, the upper portion of said chamber operating as a pocket to retain a gas under pressure to prevent the level of the liquid rising unduly in the said chamber, radiating means supported in the chamber above the liquid level for emanating rays into the liquid, and automatic means for maintaining the pressure of the gas in the pocket to prevent the liquid from submerging the radiating means.

2. In apparatus for treating a body of liquid with radiant energy, the combination of a chamber having a depressed opening to admit the liquid into the chamber, the upper portion of the said chamber operating as a pocket to retain a gas under pressure in the chamber to prevent the level of the liquid rising unduly in said chamber, means controlled by the level of the liquid to admit gas to maintain the pressure of the gas in the pocket, and radiating means supported within the pocket above the liquid level therein.

3. In an apparatus for treating a body of liquid, with radiant energy, the combination of a retaining wall for a body of liquid, having a chamber extending laterally and upwardly within said wall with an opening in the vertical face of the wall to admit a portion of the liquid into the chamber, the upper portion of said chamber operating to retain air or gas under pressure to prevent the level of the liquid rising unduly in said chamber, and radiating means supported in the chamber above the liquid level therein so as to permit rays from the radiating means to pass laterally into the relatively large body of liquid.

CHARLES W. SIRCH.